Dec. 16, 1941.  M. MORRISON  2,266,434
DENTAL MODEL
Filed Sept. 13, 1939
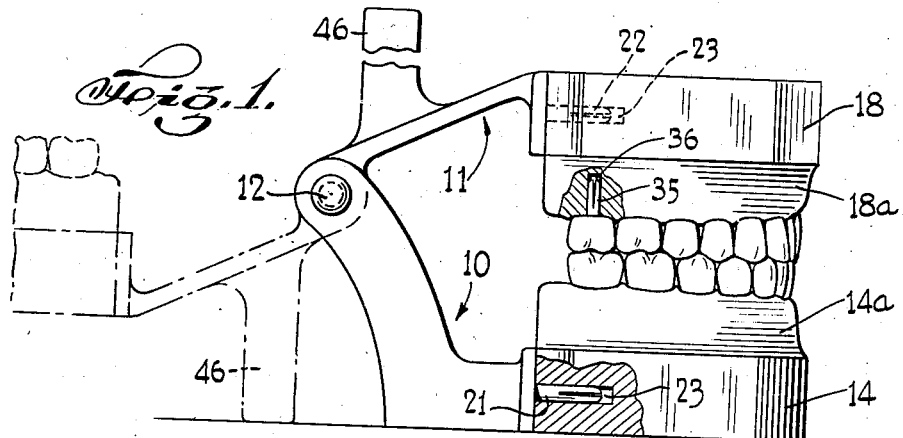
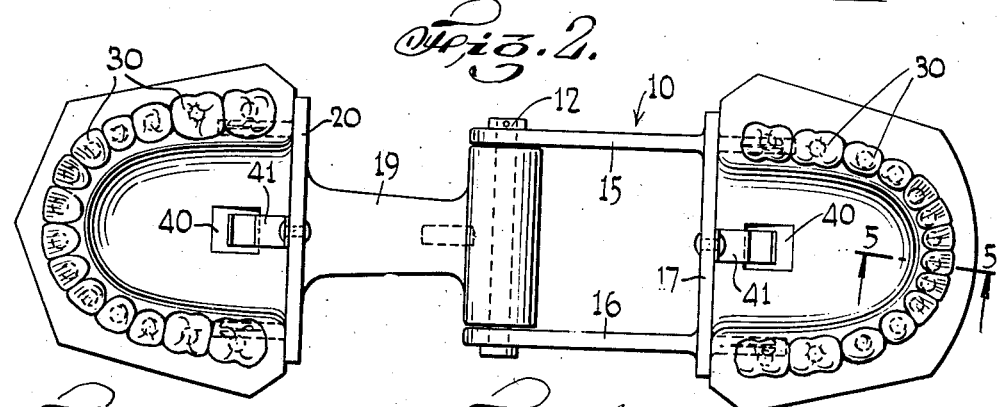
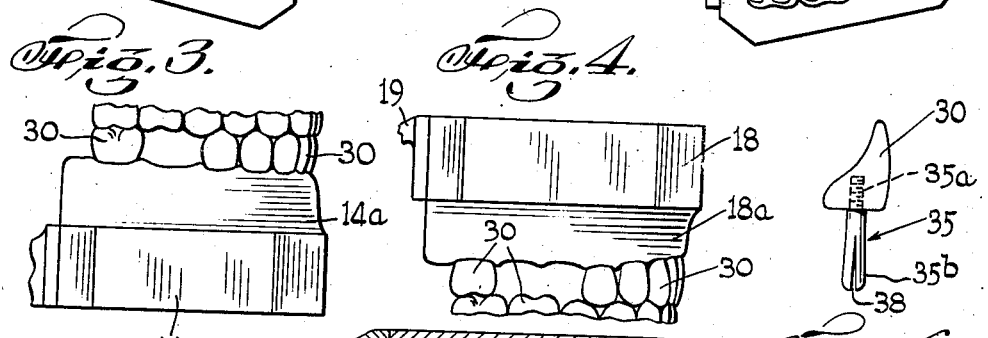
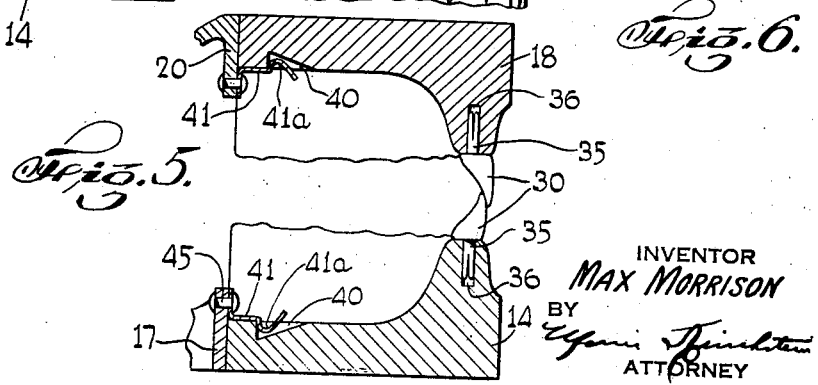
INVENTOR
MAX MORRISON
BY
ATTORNEY Patented Dec. 16, 1941

2,266,434

UNITED STATES PATENT OFFICE 2,266,434

DENTAL MODEL

Max Morrison, Brooklyn, N. Y.

Application September 13, 1939, Serial No. 294,571

1 Claim. (Cl. 32—32)

This invention relates generally to dental models. More particularly, my invention relates to an improved dental model adapted for use in demonstrating proposed work to be done for patients.

One of the objects of my invention is to provide a dental model of the character described which shall have improved means for removably attaching teeth simulating members thereto.

Another object of my invention is to provide a dental model of the character described comprising an articulator and jaw simulating members so designed that the jaw members may be readily detached from the articulators and replaced by other jaw members, if desired.

Still another object of my invention is to provide a dental model of the character described which shall comprise relatively few and simple parts, which shall be relatively inexpensive to manufacture, which shall be easy to assemble, simple to operate and which at the same time shall represent a general improvement in the art.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claim.

In the accompanying drawing, in which is shown one of the various possible embodiments of this invention, Fig. 1 is a side elevational view partly sectional of a dental model constructed in accordance with my invention and shown in closed position;

Fig. 2 is a top plan view thereof, but showing the same in open position;

Figs. 3 and 4 are fragmentary elevational views of a portion of the device shown in Fig. 1 but illustrating the manner of the use thereof;

Fig. 5 is a cross-sectional view taken substantially on the line 5—5 of Fig. 2 but showing the model in the same closed cooperative position illustrated in Fig. 1; and Fig. 6 is an enlarged elevational view showing the detailed construction of a single tooth member.

It is well known that dentists generally have heretofore been troubled by their inability to satisfactorily explain to the patient just what type of dental work they proposed to do to correct a given condition of the teeth. In accordance with the present invention, therefore, I have provided an improved construction for a dental model which will enable the dentist to readily and clearly demonstrate to the patient, first, the actual condition of his teeth, and second, the various means by which the said condition may be remedied.

Referring now in detail to the drawing, I have shown a dental model constructed in accordance with my invention and consisting of an articulator comprising the parts 10 and 11 pivotally interconnected by the pivot 12. The articulator part 10, designed to support a model 14 of the lower jaw, comprises a pair of parallel arms 15 and 16 spaced apart from each other and interconnected by a cross-bar 17 at corresponding ends thereof and having the rotatably mounted shaft or pivot 12 interconnecting the opposite ends of said arms 15 and 16. The articulator part 11, adapted to support an upper jaw model 18, comprises a central web or stem 19 rigidly attached at one end thereof to the pivot 12 for movement therewith and having at the other end thereof a crossbar 20 similar to the bar 17. The jaw models 14 and 18 are preferably made of non-inflammable material such as, for example, "Ivorine" and are provided with gum simulating portions 14a and 18a, respectively, which may be colored the same color as the human gums.

The models 14 and 18 are removably mounted on the articulator parts 10 and 11 in the following manner: A pair of projecting pins 21 are provided on the crossbar 17 of the part 10 and another similar pair of projecting pins 22 are provided on the crossbar 20 of the part 11. The pairs of pins 21 and 22 are designed to be slidably received in suitable openings 23 in the models 14 and 18 to frictionally hold the said models attached to said articulator. It is noted that the openings 23 are of slightly greater depth than the length of the pins 21 and 22, to prevent undue strain upon and consequent damage to the said models 14 and 18. In order to provide a resilient clutching connection between the models 14 and 18 and the articulator parts 10 and 11, the pins 22 and 23 may be bifurcated or slit inwardly from the edge thereof, as shown, to provide resilience and thus facilitate the removal of the models from the articulator while at the same time aiding in frictionally maintaining them in the opening 23. This feature is important since it has been found necessary for the dentist to remove one or both jaw models from the articulator in order to more clearly explain or demonstrate the work to be done.

Suitably mounted in the gum portions 14a and 18a of the jaw models 14 and 18 are upper and lower sets of tooth simulating members 30 of the same contour and similarly positioned as the teeth in the average human mouth. In order to demonstrate to the patient the actual condition of his mouth as regards missing teeth and teeth which it is proposed to extract, the tooth simulating members 30 are removably mounted in the gum simulating portions of the models 14 and 18. The following means have been found extremely effective for independently mounting each tooth member 30 so that it will maintain its position whichever way the articulator is held and so that selected tooth members may be readily removed for demonstration purposes: As clearly shown in Fig. 6, a pin 35 is provided for each tooth member 30. One end 35a of the pin is threadedly received in the tooth member 30, leaving a projection portion 35b. The said projecting portion 35b of each tooth member 30 is adapted to be slidably and frictionally received in corresponding openings 36 in the gum portions of the models 14 and 18. The depth of the openings 36 is slightly greater than the length of the projecting pin portions 35b to prevent damage to the said models 14 and 18 and to retain the teeth 30 in proper position. In order for the tooth members 30 to frictionally maintain a firm hold on the models 14 and 18 and at the same time to be readily removed therefrom, the pin projecting portions 35b are provided with slits 38 extending inwardly from the edge thereof to render the same resilient so that they will resiliently and frictionally engage the surrounding walls of the openings 36 into which they are received.

It is thus seen from the above description that when the dentist receives a patient for dental work, he may simulate the actual condition of the teeth in the patient's mouth by selectively removing tooth members 30 from either the model 14 or the model 18 corresponding to the actual condition of the patient's teeth and he may then demonstrate to the patient the present condition of his teeth by the model and at the same time explain the various ways in which the condition may be remedied as well as the cost for each particular type of construction. Thus, for example, in Fig. 3 there is shown a condition in which one tooth member 30 has been removed and in which the articulator is in closed position so that the patient may see exactly how his teeth appear to others. In Fig. 4 there is shown a condition in which two absent tooth members 30 have been removed from the upper jaw. This condition may be remedied by bridgework or any other suitable type of construction which may be readily explained by the dentist to the patient with the aid of the model.

In accordance with my invention the following means are provided for resiliently maintaining the articulator in assembled relationship with the jaw models: The upper jaw model 18 and the lower jaw model 14 are each provided with a recessed portion 40 on the inner surface thereof which is adapted to receive therein the rounded hook portion 41a of a resilient member 41 attached to each of the crossbars 17 and 20 as clearly shown in Figs. 2 and 3 of the drawing. The resilient members 41 may be permanently attached to the bars 17 and 20 by any suitable attaching means such as, for example, the rivets 45. When it is desired to disassemble the jaw models from the articulator, it is merely necessary to exert a slight force sufficient to pull apart the model members 14 and 18 to cause the portions 41a of the members 41 to be withdrawn from their recesses 40. A supporting lug 46 may be attached to the stem 19 of the articulator part 11, as shown in Fig. 1, so that when the articulator is in open position as in Fig. 2, or as shown in dotted lines in Fig. 1, the said lug will contactively engage the same support upon which the model member 14 rests, to maintain the articulator in balanced position.

It is noted that the tooth members 30 are preferably made of the same material as that of the models 14 and 18, namely "Ivorine" which is the natural color of human teeth. It is also noted that the tooth members 30 are shaped to conform to the actual shape of human teeth. The pins 35 may be made of metallic material such as steel which can be readily threaded and which maintain their rigidity and resilience.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

An articulator of the character described comprising a pair of hingedly connected members, one of said members including a pair of parallel arms spaced apart from each other and interconnected by a cross bar at corresponding ends thereof, the portion of said arms adjacent said bar being adapted to rest in a support, said arms having upstanding parallel portions spaced from said bar and interconnected by a shaft rotatably mounted thereon, the other of said members comprising a central web having a bearing at one end thereof journalled about said shaft, between and in sliding contact with said upstanding arm portions, said web having a cross bar on the other end thereof and a leg attached to said web adjacent said bearing and adapted to rest on said supporting surface between and near said arms when said articulator is in open position to maintain said articulator in balance, upper and lower jaw models, means for non-destructively removably mounting said jaw models on said hingedly connected members, said means comprising projections in each of said cross bars frictionally received in openings in said jaw models and spring members cantilever mounted on each of said cross bars, the free end of each of said spring members having raised portions which are resiliently received in recesses in said jaw models to resiliently lock the same in position, the projections and raised portion engaging each of said jaw models being disposed in non-aligned, spaced relationship and in a plane substantially parallel to said cross bars, a plurality of tooth members, and means for independently removably mounting each of said tooth members on said jaw models, said last named means comprising a pin having one end thereof threadedly attached to said tooth members and having the other end thereof frictionally received in a corresponding opening in one of said jaw models, said last named pin portion being split inwardly from the free end thereof to render the same resilient to facilitate the removal and replacement of said tooth members from said jaw models.

MAX MORRISON.